A. PEDEN.
TOY.
APPLICATION FILED APR. 12, 1920.
1,346,053.
Patented July 6, 1920.
2 SHEETS—SHEET 2.
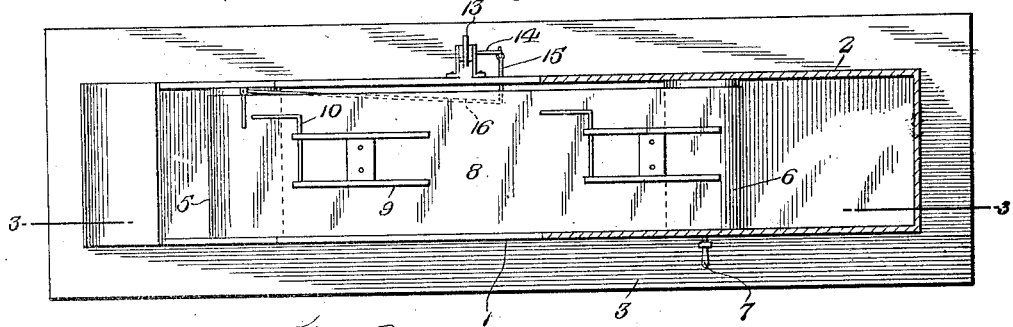
Fig. 4.
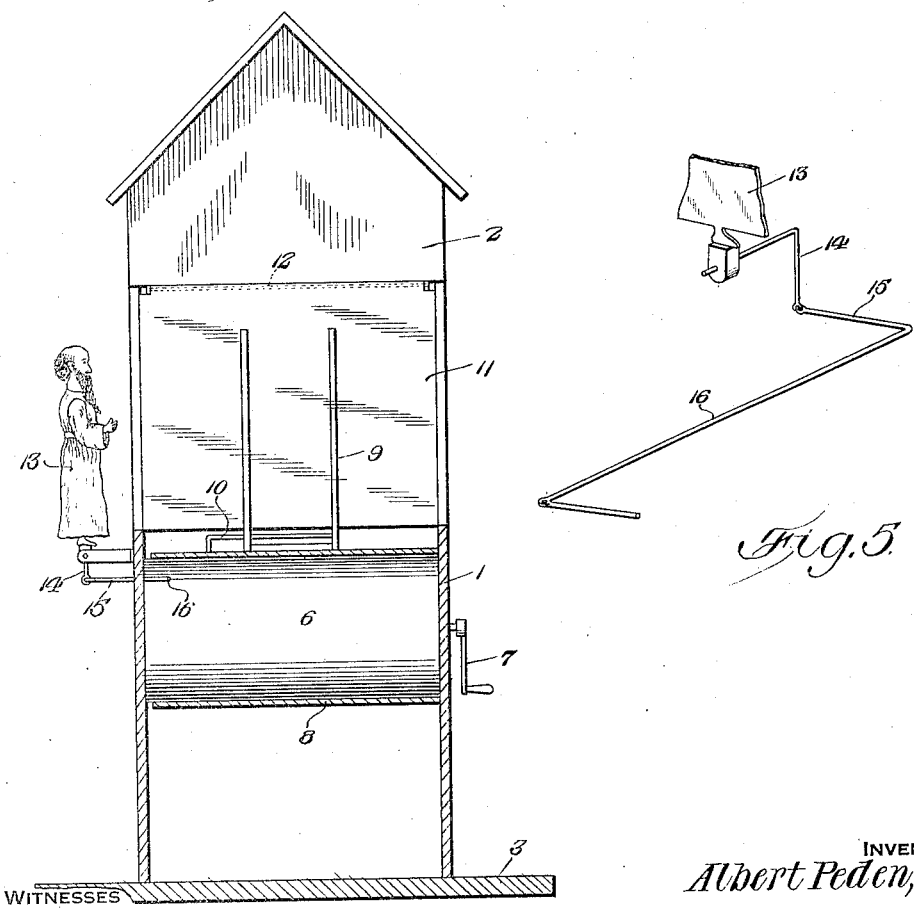
Fig. 2.
Fig. 5.
WITNESSES
INVENTOR
Albert Peden,
BY Victor J. Evans
ATTORNEY

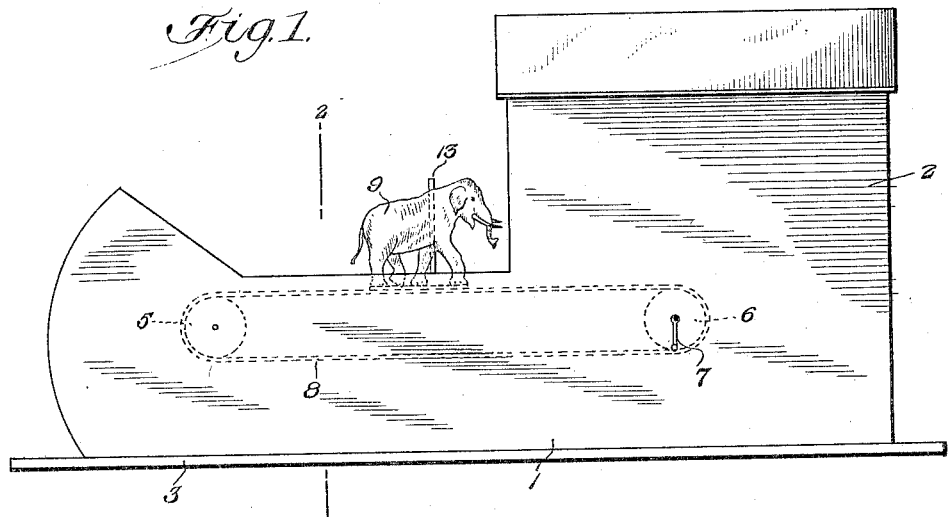
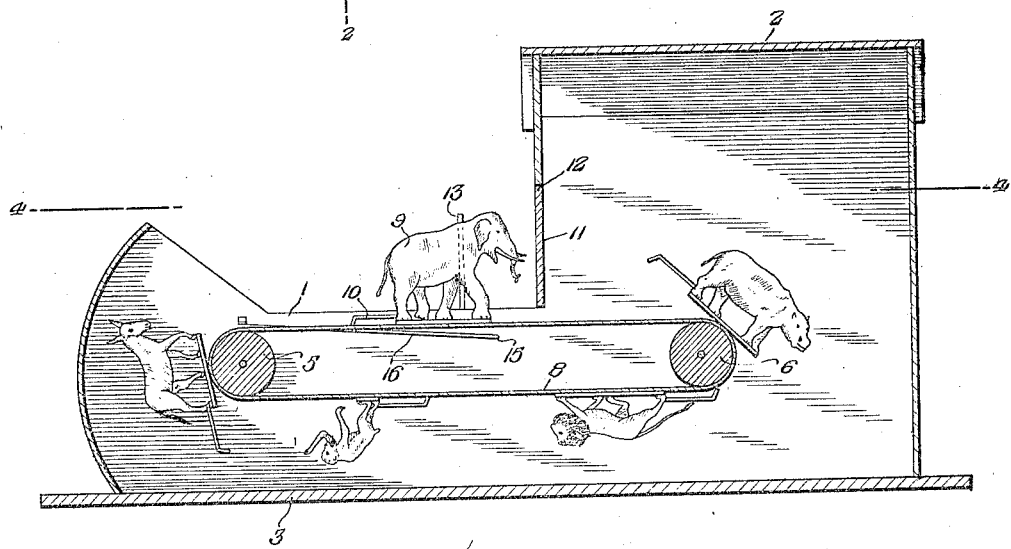

UNITED STATES PATENT OFFICE.

ALBERT PEDEN, OF JOHNSTOWN, PENNSYLVANIA.

TOY.

1,346,053. Specification of Letters Patent. Patented July 6, 1920.

Application filed April 12, 1920. Serial No. 373,208.

*To all whom it may concern:*

Be it known that I, ALBERT PEDEN, a citizen of the United States, residing at Johnstown, in the county of Cambria and State of Pennsylvania, have invented new and useful Improvements in Toys, of which the following is a specification.

This invention relates to improvements in toys and has for its object to produce a toy of novel construction so arranged as to represent a series of animals or figures passing into an ark, fort house or other building and having another figure as in review of the first referred to figures and adapted to be actuated by the movement of the first mentioned figures as to bow or otherwise salute the said first mentioned figures, thus affording amusement as well as being instructive.

With the above and other objects in view the improvement resides in the construction, combination and arrangement of parts set forth in the following specification and falling within the scope of the appended claim.

In the drawings:

Figure 1 is a side elevation of a toy constructed in accordance with the present invention, Fig. 2 is a transverse sectional view approximately on the line 2—2 of Fig. 1, Fig. 3 is a central vertical longitudinal sectional view approximately on the line 3—3 of Fig. 2, Fig. 4 is a horizontal sectional view approximately on the line 4—4 of Fig. 3, Fig. 5 is a detail illustrating the connection between the swinging figure and the operating means therefor actuated by the continuous belt.

Referring to the drawings in detail, the numeral 1 designates the body of an ark and 2 the cabin formed upon one end of the ark. The ark, in the present instance, is preferably constructed of two spaced vertically arranged longitudinally extending boards secured to a flat base 3. Between the sides of the ark adjacent to the opposite ends thereof are rollers 5 and 6 respectively, the same having short shafts or trunnions which are journaled in suitable openings in the said sides of the ark, and the trunnion for the roller 6 is provided with a handle 7 which is arranged outwardly of one of the sides of the device. Extending around the rollers is an endless belt or carrier 8, and upon this belt or carrier is mounted the several toy figures representing animals which are indicated by the numerals 9. As disclosed by the drawings the animals are arranged in pairs, and the endless belt, to the rear of each pair of animals is provided with an offset contact member 10, the purpose of which will presently be described. The cabin of the ark has its front partly open and is normally closed by a door 11 which is loosely connected to the cabin at the upper portion of the said door, as indicated by the numeral 12 and the door is adapted to be swung inwardly of the cabin by contact therewith by the several figures upon the endless belt.

Upon one of the sides of the ark adjacent to the cabin is pivotally secured a figure 13 that is designed to represent Noah and who is thus represented as standing in review of the animals entering the ark. The figure 13 is so disposed as to normally be arranged in a vertical position and is provided, at its pivotal connection with an offset finger 14, and this finger is adapted to be contacted by the angular end 15 of a rod 16, the said end 15 passing through a suitable opening in one of the side boards of the construction, and the rod being pivoted or otherwise secured to the inner face of the said side board, the inner end of the rod being provided with an offset portion or trigger disposed to be engaged by the contact members 11 and consequently to swing the rod upon its pivot to bring the outer offset end thereof to engage with the finger of the figure 13 to cause the said finger to be tilted to assume a bowing position.

It will thus be noted that as each pair of animals passes the figure representing Noah the same will be saluted by the figure and the device is operated by turning the handle as will, it is thought, be readily understood.

Having thus described the invention, what I claim is:

A toy comprising a receptacle, rollers journaled in the receptacle, an operating handle for one of the rollers, an endless band around the rollers, toy figures arranged in pairs upon the band, contact members upon the band, a pivoted rod having offset ends upon one of the sides of the receptacle and one of the said offset ends being disposed within the path of engagement between the contact members, and the other offset end passing through an opening in the side of the receptacle, a normally vertically disposed figure pivotally secured to one of the sides of the receptacle, and said figure having an offset finger disposed within the path of contact of the last mentioned offset end of the rod.

In testimony whereof I affix my signature.

ALBERT PEDEN.